United States Patent
Bjorum et al.

[15] 3,667,163
[45] June 6, 1972

[54] AUTOMOBILE DOOR GUARD

[72] Inventors: Erick H. Bjorum, 640 Island View Drive, Seal Beach, Calif. 90740; John G. Gibson, 18985 Santa Mardina, Fountain Valley, Calif. 92708; Morgan C. Lindberg, North Hollywood, Calif.

[22] Filed: Oct. 8, 1970

[21] Appl. No.: 79,201

[52] U.S. Cl. ............................................................49/462
[51] Int. Cl. .............................................................B60j 5/04
[58] Field of Search ..........................................49/462, 460

[56] References Cited

UNITED STATES PATENTS

| | | |
|---|---|---|
| 3,494,075 | 2/1970 | Kunevicius ..............................49/462 |
| 2,146,090 | 2/1939 | O'Rourke ................................49/462 |
| 2,733,097 | 1/1956 | Stevens...................................49/462 |
| 3,288,512 | 11/1966 | Zientara................................49/460 X |
| 2,881,468 | 4/1959 | Simone ................................49/462 X |

FOREIGN PATENTS OR APPLICATIONS

| | | | |
|---|---|---|---|
| 352,916 | 4/1961 | Switzerland ............................49/462 |

*Primary Examiner*—Kenneth Downey
*Attorney*—Fulwider, Patton, Rieber, Lee & Utecht

[57] ABSTRACT

An automobile door guard including a mounting plate formed on one side with mounting surface for securement to the exterior of an automobile door. A protruding resilient bumper is mounted on the side of the mounting plate opposite the one side. Adhesive means is disposed on the mounting surface and is covered with a removable covering strip whereby such strip may be removed and the guard positioned on an automobile door with the adhesive means exposed for adhering such guard to the door.

5 Claims, 7 Drawing Figures

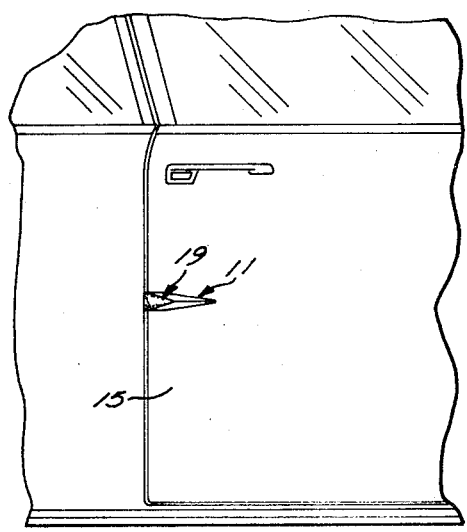
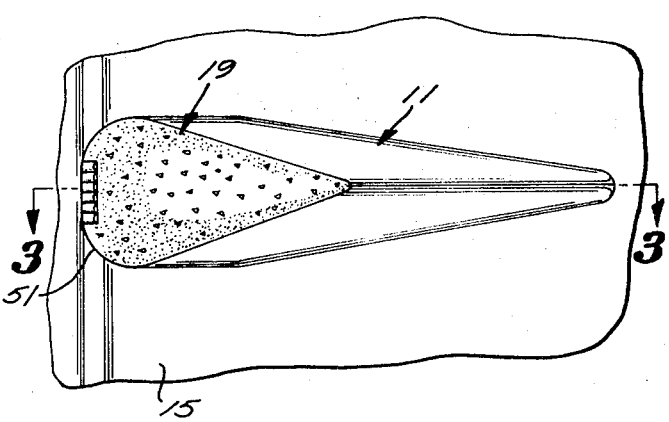
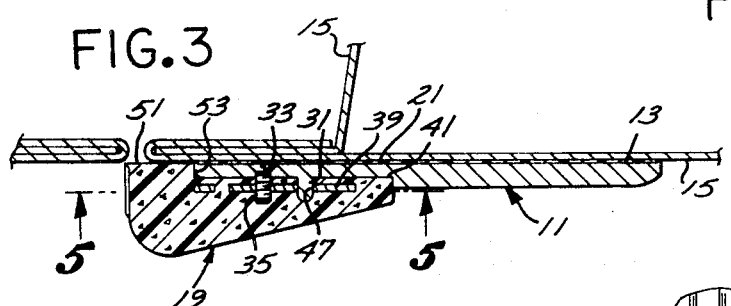
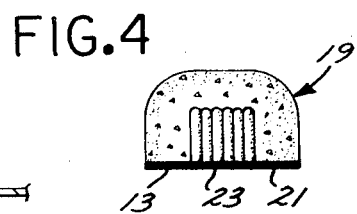
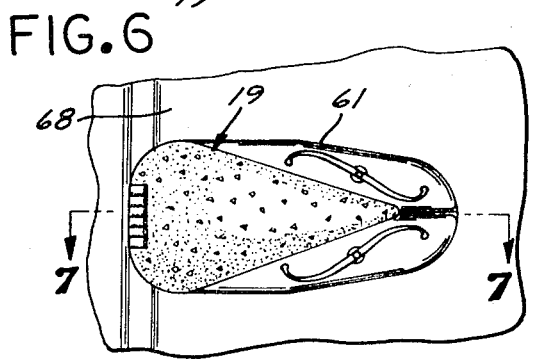
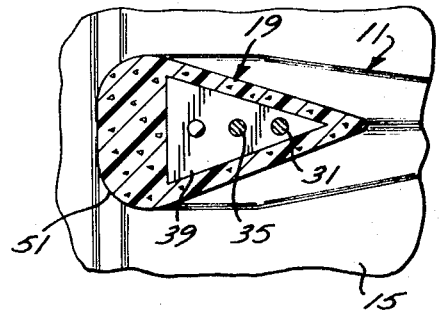
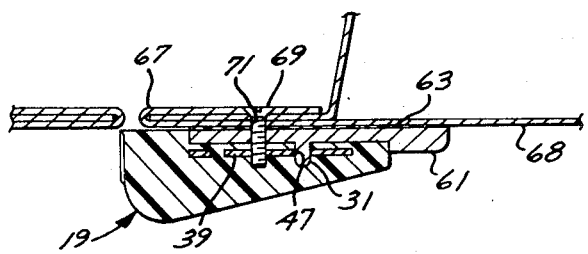
INVENTORS.
ERICK H. BJORUM
JOHN G. GIBSON
MORGAN C. LINDBERG
BY Fulwider, Patton, Rieber, Lee and Utecht
ATTORNEYS 3,667,163

AUTOMOBILE DOOR GUARD

BACKGROUND OF THE INVENTION

1. Field of the Invention

The present invention relates to guards for mounting on the exterior of automobile doors to protect the free edges of such doors from being swung into contact with the side of an automobile parked adjacent thereto.

2. Description of the Prior Art

Automobile door guards have been proposed which include integral clevis type mounting clamps which are adapted for clamping to the peripheral flange of an automobile door. However, door guards of this type suffer the shortcoming that the position at which such clamp may be positioned on the peripheral flange of a door is frequently restricted by the contour of such door. This restriction is particularly detrimental when the most protruding portion of the door is formed with a bend or excessively arcuate contour thereby preventing such prior art door guards from being mounted at such most protruding locations.

Additionally, such prior art clamp type mounting means are frequently not tightened sufficiently by the person mounting such door guard and when the door is swung open causing such guard to slam against the side of another car parked adjacent thereto the guard is knocked loose or askew. Additionally, since the side of the car on which the open door is located raises when the passenger exits, the free edge of the open door will raise considerably thereby dragging such guard upwardly along the side of the adjacent car and causing it to catch on molding or the like and applying rather high forces to such bumper and many of the prior art mounting clamps cannot hold against these forces.

SUMMARY OF THE INVENTION

The door guard of the present invention is characterized by a mounting plate which has a resilient bumper mounted on one side thereof and an adhesive means on the opposite side thereof for adhering such plate to the exterior of the car door. The adhesive means is covered by a removable covering strip.

An object of the present invention is to provide an automobile door guard of the type described which is convenient to mount securely on the exterior of an automobile door after assembly of the automobile has been completed.

Another object of the present invention is to provide an automobile door guard of the type described which provides a reflective surface for reflecting the lights of automobiles approaching the side of the automobile on which such guard is mounted.

These and other objects and the advantages of the present invention will become apparent from a consideration of the following detailed description when taken in conjunction with the accompanying drawings.

DESCRIPTION OF THE DRAWING

FIG. 1 is a side elevational view of an automobile having a door guard embodying the present invention mounted thereon;

FIG. 2 is an enlarged top plan view of the automobile door guard shown in FIG. 1;

FIG. 3 is a longitudinal sectional view taken along the line 3—3 of FIG. 2;

FIG. 4 is an end view, in enlarged scale, showing the automobile door guard shown in FIG. 1 before installation;

FIG. 5 is a sectional view along the line 5—5 of FIG. 3;

FIG. 6 is a top plan view of a second embodiment of the automobile door guard of the present invention and showing it installed on an automobile door; and FIG. 7 is a sectional view taken along the line 7—7 of FIG. 6.

DESCRIPTION OF THE PREFERRED EMBODIMENTS

Referring to FIGS. 1 and 3 the automobile door guard of the present invention includes a mounting plate, generally designated 11, which is formed on one side with a relatively flat mounting surface 13 for securement to the exterior surface of an automobile door 15. A resilient protruding bumper, generally designated 19, is mounted on the side of the mounting plate opposite the mounting surface 13. Referring to FIG. 4, a pressure sensitive adhesive 21 is disposed on the mounting surface 13 and is covered with a removable covering strip 23. Consequently, the door guard may conveniently be mounted on an automobile door 15 by merely removing the covering strip 23 and positioning such guard on the door at the desired location and pressing the mounting plate 11 firmly against such door.

The mounting plate 11 is in the form of an electro-plated plastic and includes a longitudinal reinforcing rib 27 for providing longitudinal rigidity. Referring to FIG. 1, the rib 27 terminates near the left hand end of the mounting plate 11 and such plate forms a generally flat surface for receipt of the bumper 19. The plate 11 is formed with an upwardly projecting indexing peg 31 which is received in the bumper to prevent rotation thereof. The mounting plate 11 is also formed with a counter-sunk through bore 33 for receipt of a mounting screw 35.

The bumper 19 is made from a virgin vinyl material which is commercially available in granular form and when processed and molded hardens to provide a transparent appearance. Dispersed throughout the bumper 19 are silver and gold light reflective flecks 37 which act as reflectors for reflecting the lights of oncoming cars.

Referring to FIG. 3, the bumper 19 includes a triangular backing plate 39 spaced a short distance in from the mounting surface of such bumper. The reinforcing plate 39 includes a first bore 45 for receipt of the self-tapping screw 35 and a second bore 47 for receipt of the index peg 31. Still referring to FIG. 3, the right hand end of the bumper 19 overhangs the right hand end of the mounting plate 11 and then projects downwardly to form an overhanging portion 51 disposed at the right hand end of such mounting plate and defining a shoulder 53 which abuts such right hand end.

In operation the door guard may be installed by merely stripping the covering strip 23 off the pressure sensitive adhesive 21 and locating the mounting plate 11 on the door 15 at the desired location and pressing the plate 11 firmly against such door. In order to provide the most protection for the door 15 and the sides of other cars parked adjacent to such door 15 the automobile door guard of the present invention should be located on the door 15 at the location which forms the greatest protuberance. In this regard, it is particularly important that the mounting plate 11 may be adhered to a curved door 15 and may be located immediately above or below a definite bend or break in such curvature. Further, if desired the undersurface 13 of such plate 11 may be curved or indented for accommodating curvatures or small projections formed by the curvature of the door 15.

With the automobile door guard of present invention installed, when the door 15 is swung sufficiently far open to bring the free edge of the door 15 adjacent another automobile located adjacent such door, the bumper 19 will engage the side of such adjacent automobile to avoid metal-to-metal contact. It will be realized that when the passenger exits the automobile the free edge of the door 15 will rise considerably due to the unweighting of that side of the car thereby resulting in the bumper 19 being carried upwardly along the side of the car against which it is engaged. Many automobiles include longitudinal moldings or projections along the sides thereof and if the bumper 19 engages such molding or projection during its upward travel a considerable downward force is applied to the free end of such bumper thereby applying considerable torque to the plate 11 tending to tear it free from the door 15. However, the pressure sensitive adhesive 21 has proven to have sufficient adhesiveness to prevent the mounting plate 11 from being torn free from the door 15 under nearly all forces normally applied to the bumper 19.

Further, the mounting screw 35 and indexing pin 31 cooperate in holding the backing plate 39 firmly against rotation thereby maintaining the bumper 19 securely mounted on the mounting plate 11.

The automobile door guard shown in FIG. 6 is substantially the same as that shown in FIG. 1 except that the mounting plate 61 is somewhat shorter to thereby enable the guard to assume a certain amount of misalignment from a horizontal position without detection by a casual observer. Referring to FIG. 7 the mounting plate 61 includes a pressure sensitive adhesive 63 on the underside thereof but is mounted from the vertically extending peripheral flange 67 formed at the free edge of the door 68 by means of a mounting screw 69. The bore 71 for the screw 69 may be stamped in the flange 67 when the car is manufactured or may subsequently be punched or drilled by the individual installing the door guard.

In operation the door guard shown in FIGS. 6 and 7 may be mounted by merely removing the removable strip (not shown) to expose the adhesive 63 and mounting the door guard as described hereinabove in connection with the door guard shown in FIG. 1. Alternatively, the door guard shown in FIGS. 6 and 7 may be installed by drilling or punching the bore 71 for the screw 69 and inserting such screw to hold the door guard in position. As a practical matter, the adhesive 63 will assist in holding the door guard securely in position and prevent rotation thereof.

From the foregoing it will be apparent that the automobile door guard of the present invention provides an economical and convenient means for protecting an automobile door itself as well as protecting the finish of automobiles parked adjacent to such door. The door guard of the present invention is convenient to install and can be installed in nearly any location along the door and will remain securely in position irrespective of dislodging forces applied thereto.

Various modifications and changes may be made with regard to the foregoing detailed description without departing from the spirit of the invention.

We claim:
1. An automobile door guard comprising:
  a mounting plate formed on one side with a mounting surface for securement to the exterior of an automobile door, said mounting plate being formed with a through bore and an index pin spaced from said bore and projecting from the side of said mounting plate opposite said one side;
  a protruding resilient bumper disposed on the side of said plate opposite said one side and including respective openings aligned with said through bore and said index pin;
  a backing plate embedded in said bumper and including an opening receiving said index pin and a threaded bore aligned with said through bore;
  screw means projecting through said through bore and threadably engaging said threaded bore;
  adhesive means on said mounting surface for securing said plate to said automobile door; and
  removable covering means removably secured to said adhesive means whereby said covering means may be removed to expose said adhesive means and said mounting plate placed at the desired location on said automobile door with said adhesive engaging said door to secure said guard to said door.

2. An automobile door guard as set forth in claim 1 wherein: said bumper includes reflector means.

3. An automobile door guard as set forth in claim 1 wherein: said bumper overhangs one end of said mounting plate and projects downwardly over a portion of said one end to define a shoulder confronting said one end.

4. An automobile door guard as set forth in claim 1 wherein: said mounting plate includes an opening therein and said door guard includes:
  a mounting screw for extension through a hole in the flange of said door and screwing into said opening.

5. An automobile door guard as set forth in claim 1 wherein: said bumper overhangs one end of said mounting plate and projects downwardly past said one end to the level of said mounting surface to bear against the surface of the door.

* * * * *